US012043983B2

(12) United States Patent
Hijikata et al.

(10) Patent No.: US 12,043,983 B2
(45) Date of Patent: Jul. 23, 2024

(54) CONSTRUCTION MACHINE

(71) Applicant: Hitachi Construction Machinery Co., Ltd., Tokyo (JP)

(72) Inventors: Seiji Hijikata, Tsukuba (JP); Yasutaka Tsuruga, Ryugasaki (JP); Kenji Hiraku, Kasumigaura (JP); Masatoshi Hoshino, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 60 days.

(21) Appl. No.: 17/908,040

(22) PCT Filed: Apr. 7, 2021

(86) PCT No.: PCT/JP2021/014792

§ 371 (c)(1),
(2) Date: Aug. 30, 2022

(87) PCT Pub. No.: WO2021/256058

PCT Pub. Date: Dec. 23, 2021

(65) Prior Publication Data

US 2023/0105014 A1 Apr. 6, 2023

(30) Foreign Application Priority Data

Jun. 19, 2020 (JP) ................................ 2020-106355

(51) Int. Cl.
*E02F 9/22* (2006.01)
*E02F 9/20* (2006.01)
(Continued)

(52) U.S. Cl.
CPC .......... *E02F 9/2228* (2013.01); *E02F 9/2004* (2013.01); *E02F 9/2217* (2013.01);
(Continued)

(58) Field of Classification Search
CPC ..... E02F 9/2217; E02F 9/2239; E02F 9/2292; F15B 11/024; F15B 11/17; F15B 21/14
See application file for complete search history.

(56) References Cited

U.S. PATENT DOCUMENTS

2014/0102289 A1 4/2014 Wu
2017/0363115 A1* 12/2017 Hahn ........................ F15B 1/04
(Continued)

FOREIGN PATENT DOCUMENTS

JP 2008-89024 A 4/2008
JP 2009-275775 A 11/2009
(Continued)

OTHER PUBLICATIONS

International Search Report (PCT/ISA/210) issued in PCT Application No. PCT/JP2021/014792 dated Jun. 29, 2021 with English translation (four (4) pages).
(Continued)

*Primary Examiner* — Kenneth Bomberg
*Assistant Examiner* — Matthew Wiblin
(74) *Attorney, Agent, or Firm* — Crowell & Moring LLP

(57) ABSTRACT

An object of the present invention is to provide a construction machine that can use the return oil from a hydraulic actuator effectively. For this purpose, a controller computes a flow rate of the return oil from a first hydraulic actuator on the basis of an operation signal from a first operation device, computes a flow rate of oil to be supplied to a second hydraulic actuator on the basis of an operation signal from a second operation device, sets smaller one of the flow rate of the return oil and the flow rate of the oil to be supplied, as a regeneration flow rate that is a flow rate of oil to be regenerated in the second hydraulic actuator, sets a flow rate obtained by subtracting the regeneration flow rate from the flow rate of the return oil, as a recovery flow rate that is a
(Continued)

flow rate of oil to be recovered to a pressure accumulating device, adjusts an opening degree of a first control valve 2 such that a flow rate of oil supplied from the first hydraulic actuator to the pressure accumulating device coincides with the recovery flow rate, and adjusts an opening degree of a second control valve such that a flow rate of oil supplied from the first hydraulic actuator to the second hydraulic actuator coincides with the regeneration flow rate.

8 Claims, 8 Drawing Sheets

(51) Int. Cl.

| | |
|---|---|
| ***E02F 9/26*** | (2006.01) |
| ***F15B 1/04*** | (2006.01) |
| ***F15B 11/024*** | (2006.01) |
| ***F15B 13/06*** | (2006.01) |
| ***F15B 21/14*** | (2006.01) |
| *E02F 3/32* | (2006.01) |

(52) U.S. Cl.

CPC .......... *E02F 9/2235* (2013.01); *E02F 9/2267* (2013.01); *E02F 9/2271* (2013.01); *E02F 9/2275* (2013.01); *E02F 9/2296* (2013.01); *E02F 9/26* (2013.01); *F15B 1/04* (2013.01); *F15B 11/024* (2013.01); *F15B 13/06* (2013.01); *F15B 21/14* (2013.01); *E02F 3/32* (2013.01); *E02F 9/2292* (2013.01); *F15B 2211/6306* (2013.01); *F15B 2211/6654* (2013.01)

(56) References Cited

U.S. PATENT DOCUMENTS

| | | | | |
|---|---|---|---|---|
| 2018/0216317 | A1* | 8/2018 | White | E02F 9/2271 |
| 2019/0211849 | A1* | 7/2019 | Rampen | F15B 11/0445 |
| 2020/0277755 | A1* | 9/2020 | Kondo | F15B 1/024 |

FOREIGN PATENT DOCUMENTS

| | | | |
|---|---|---|---|
| JP | 2011-69432 | A | 4/2011 |
| JP | 2014-206253 | A | 10/2014 |
| JP | 6284711 | B2 | 2/2018 |
| WO | WO 2013/005809 | A1 | 1/2013 |

OTHER PUBLICATIONS

Japanese-language Written Opinion (PCT/ISA/237) issued in PCT Application No. PCT/JP2021/014792 dated Jun. 29, 2021 (three (3) pages).

International Preliminary Report on Patentability (PCT/IB/338 & PCT/IB/373) issued in PCT Application No. PCT/JP2021/014792 dated Dec. 29, 2022, including English translation of document C2 (Japanese-language Written Opinion (PCT/ISA/237) filed on Aug. 30, 2022) (five (5) pages).

Korean-language Office Action issued in Korean Application No. 10-2022-7030563 dated Jan. 31, 2024 with English translation (12 pages).

* cited by examiner

CONSTRUCTION MACHINE

TECHNICAL FIELD

The present invention relates to a construction machine such as a hydraulic excavator.

BACKGROUND ART

Patent Document 1 discloses a hydraulic circuit that can resupply (regenerate) a part of return oil from a boom cylinder to another hydraulic actuator and collect (recover) the remaining oil by a collecting unit (recovering device) for the purpose of effectively using energy from the oil returned from the boom cylinder.

PRIOR ART DOCUMENT

Patent Document

Patent Document 1: JP-6284711-B

SUMMARY OF THE INVENTION

Problem to be Solved by the Invention

However, Patent Document 1 does not specifically describe what flow rate of the return oil from the boom cylinder is to be regenerated or what flow rate of the return oil is to be recovered. In a hydraulic circuit including an accumulator (pressure accumulating device) as the recovering device, for example, when a flow rate of the return oil from the boom cylinder which is to be regenerated in another hydraulic actuator is set small but a flow rate of the return oil which is to be recovered to the accumulator is set large, there is a fear that an energy loss due to heat radiation from the accumulator, a valve leak, and the like is increased and that the energy from the return oil thus cannot be used effectively.

The present invention has been made in view of the above-described problem. It is an object of the present invention to provide a construction machine that can use the return oil from a hydraulic actuator effectively.

Means for Solving the Problem

In order to achieve the above object, according to the present invention, there is provided a construction machine including a first hydraulic actuator, a pressure accumulating device that accumulates return oil from the first hydraulic actuator, a first control valve disposed on a first hydraulic line that connects the first hydraulic actuator and the pressure accumulating device to each other, a second hydraulic actuator, a second control valve disposed on a second hydraulic line that connects the second hydraulic actuator and the first hydraulic line to each other, a first operation device that outputs an operation signal for the first hydraulic actuator, a second operation device that outputs an operation signal for the second hydraulic actuator, and a controller that is inputted with the operation signals from the first operation device and the second operation device and outputs a control signal to the first control valve and the second control valve. The controller is configured to compute a flow rate of return oil from the first hydraulic actuator on the basis of the operation signal from the first operation device, compute a flow rate of oil to be supplied to the second hydraulic actuator on the basis of the operation signal from the second operation device, set smaller one of the flow rate of the return oil and the flow rate of the oil to be supplied, as a regeneration flow rate that is a flow rate of oil to be regenerated in the second hydraulic actuator, set a flow rate obtained by subtracting the regeneration flow rate from the flow rate of the return oil, as a recovery flow rate that is a flow rate of oil to be recovered to the pressure accumulating device, adjust an opening degree of the first control valve such that a flow rate of oil supplied from the first hydraulic actuator to the pressure accumulating device coincides with the recovery flow rate, and adjust an opening degree of the second control valve such that a flow rate of oil supplied from the first hydraulic actuator to the second hydraulic actuator coincides with the regeneration flow rate.

According to the present invention configured as described above, an energy loss due to heat radiation and a leak at a time of accumulating hydraulic fluids in the pressure accumulating device is suppressed by maximizing the flow rate of the return oil from the first hydraulic actuator 1 which is to be regenerated in the second hydraulic actuator, and minimizing the flow rate of the return oil from the first hydraulic actuator which is to be recovered to the pressure accumulating device. The return oil from the first hydraulic actuator can thus be used effectively.

Advantages of the Invention

The construction machine according to the present invention can use the return oil from a hydraulic actuator effectively.

MODES FOR CARRYING OUT THE INVENTION

Figure 1:
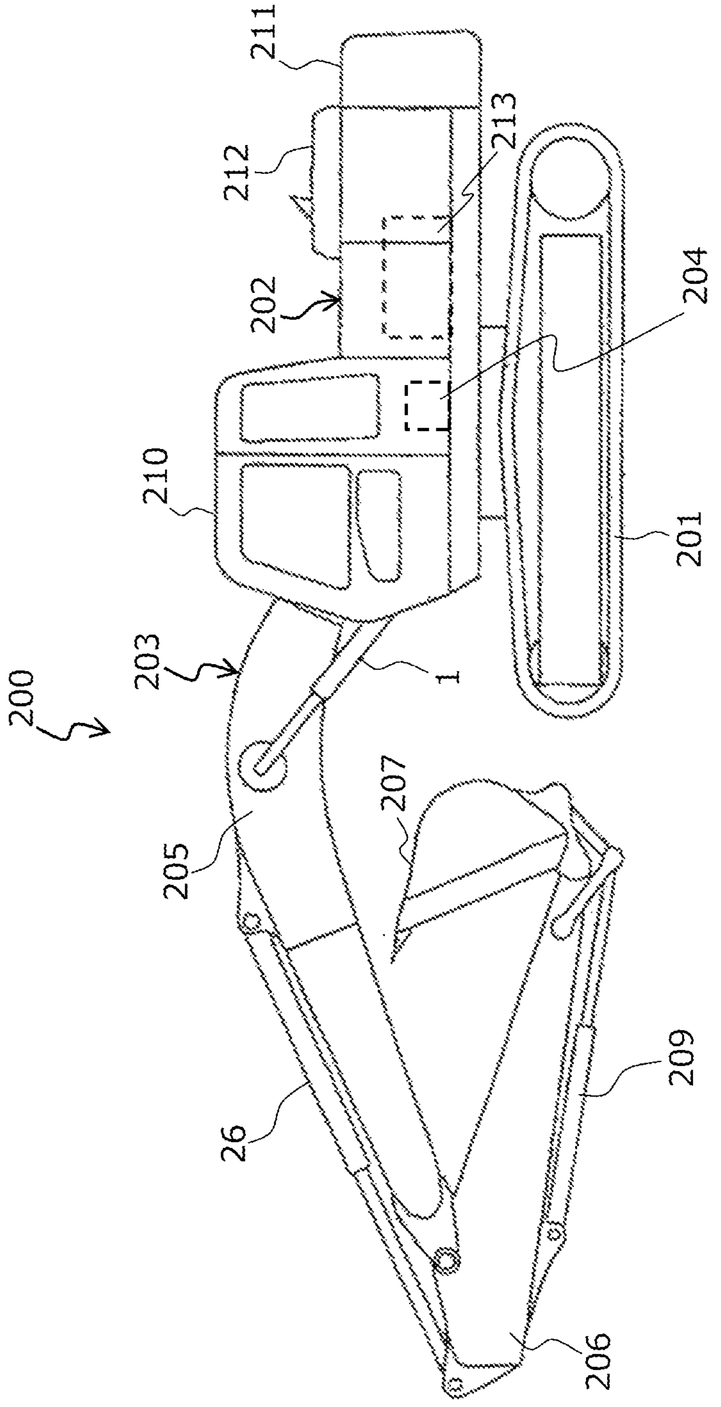
FIG. 1 is a side view of a hydraulic excavator according to an embodiment of the present invention.

With reference to the drawings, description will hereinafter be made by using a hydraulic excavator as an example of a construction machine according to an embodiment of the present invention. Incidentally, in each figure, similar members are identified by the same reference characters, and repeated description thereof will be omitted as appropriate.

FIG. 1 is a side view of a hydraulic excavator according to the present embodiment.

As illustrated in FIG. 1, a hydraulic excavator 200 includes a track structure 201, a swing structure 202 that is swingably disposed on the track structure 201 and that constitutes a machine body, and a work device 203 that is vertically rotatably attached to the swing structure 202 and that performs soil excavation work and the like. The swing structure 202 is driven by a swing motor 204.

The work device 203 includes a boom 205 vertically rotatably attached to the swing structure 202, an arm 206 vertically rotatably attached to a distal end of the boom 205, and a bucket 207 vertically rotatably attached to a distal end of the arm 206. The boom 205 is driven by a boom cylinder 1. The arm 206 is driven by an arm cylinder 26. The bucket 207 is driven by a bucket cylinder 209.

A cab 210 is provided in a front-side position on the swing structure 202. A counterweight 211 that ensures a weight balance is provided in a rear-side position on the swing structure 202. A machine room 212 is provided between the cab 210 and the counterweight 211. The machine room 212 houses an engine, a hydraulic pump, a control valve 213, and the like. The control valve 213 controls a flow of hydraulic operating fluid supplied to each actuator from the hydraulic pump.

The hydraulic excavator 200 according to the present embodiment is equipped with a hydraulic drive system to be described in each of the following embodiments.

First Embodiment

Figure 2:
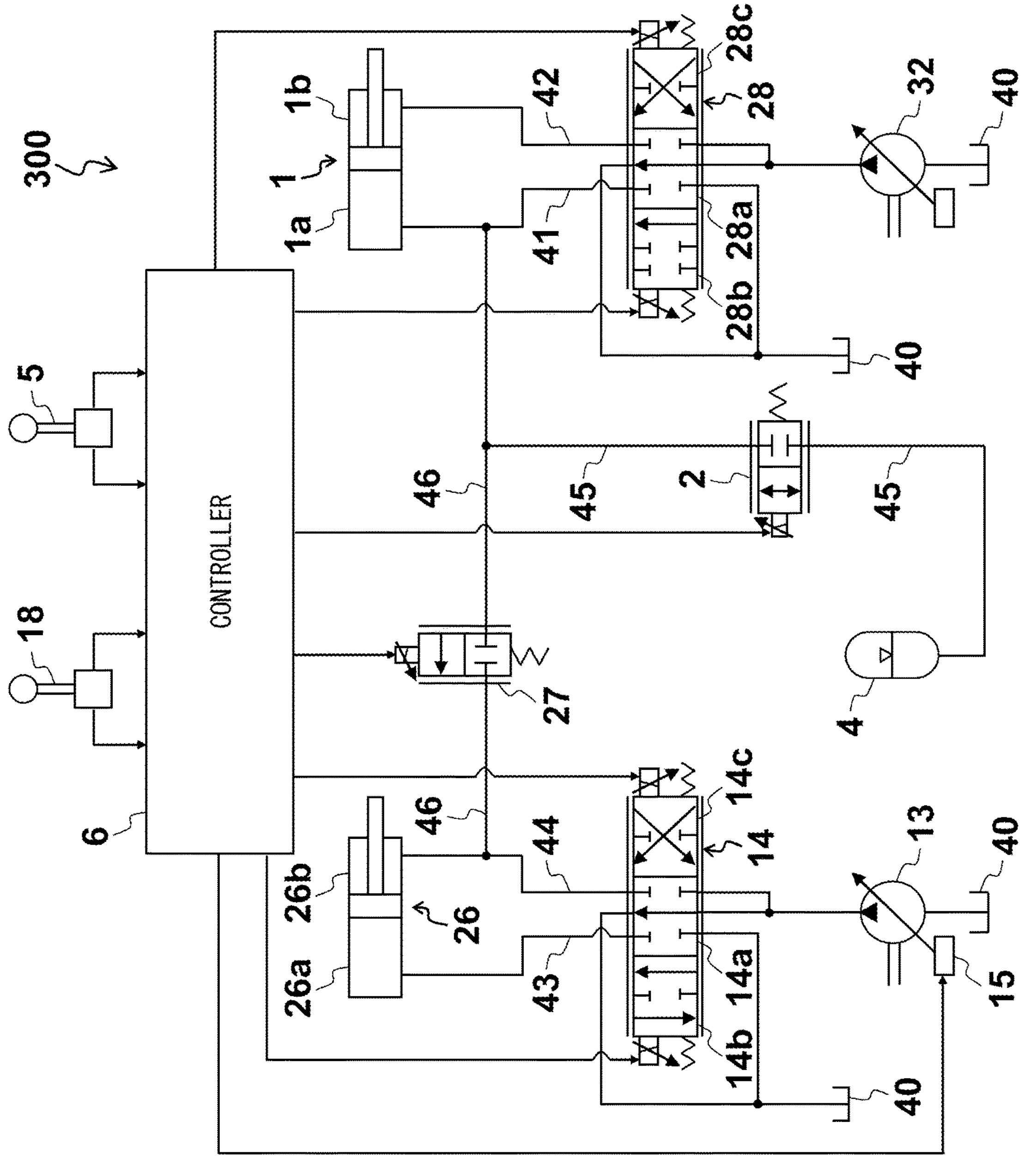
FIG. 2 is a circuit diagram of a hydraulic drive system in a first embodiment of the present invention.

FIG. 2 is a circuit diagram of the hydraulic drive system in a first embodiment of the present invention.

(Configuration)

A configuration of a hydraulic drive system 300 will be described with reference to FIG. 2.

The boom cylinder 1 is connected to a hydraulic pump 32 and a tank 40 via a directional control valve 28. The directional control valve 28 switches from a neutral position 28*a* to either a left position or a right position when receiving a control signal from a controller 6. A boom control lever 5 is an operation device for giving an instruction for the operation of the boom 205. The boom control lever 5 outputs an operation signal corresponding to an operation made by an operator to the controller 6. When the boom control lever 5 is operated in a boom raising direction, the boom control lever 5 outputs a boom raising operation signal. When the boom control lever 5 is operated in a boom lowering direction, the boom control lever 5 outputs a boom lowering operation signal. When the boom raising operation signal is inputted from the boom control lever 5 to the controller 6, the controller 6 switches the directional control valve 28 to a right-side position 28*c*. When the boom lowering operation signal is inputted to the controller 6, the controller 6 switches the directional control valve 28 to a left-side position 28*b*.

When the directional control valve 28 is switched to the right-side position 28*c*, a delivery port of the hydraulic pump 32 is connected to a bottom-side oil chamber 1*a* of the boom cylinder 1 via a hydraulic line 41 (bottom-side hydraulic line), and a rod-side oil chamber 1*b* of the boom cylinder 1 is connected to the tank 40 via a hydraulic line 42 (rod-side hydraulic line). Thus, the delivery oil from the hydraulic pump 32 flows into the bottom-side oil chamber 1*a*, the hydraulic operating fluid in the rod-side oil chamber 1*b* is discharged into the tank 40, and the boom cylinder 1 performs an extending operation. On the other hand, when the directional control valve 28 is switched to the left-side position 28*b*, the delivery port of the hydraulic pump 32 is connected to the rod-side oil chamber 1*b* via the rod-side hydraulic line 42. At this time, the bottom-side oil chamber 1*a* communicates with at least one of an accumulator 4 to be described later and a rod-side oil chamber 26*b* of the arm cylinder 26. Thus, the delivery oil from the hydraulic pump 32 flows into the rod-side oil chamber 1*b*, the hydraulic operating fluid in the bottom-side oil chamber 1*a* is discharged into at least one of the accumulator 4 and the rod-side oil chamber 26*b* of the arm cylinder 26, and the boom cylinder 1 performs a contracting operation.

The arm cylinder 26 is connected to the hydraulic pump 32 and the tank 40 via a directional control valve 14. The directional control valve 14 switches from a neutral position 14*a* to either a left position or a right position when receiving a control signal from the controller 6. An arm control lever 18 is an operation device for giving an instruction for the operation of the arm 206. The arm control lever 18 outputs an operation signal corresponding to an operation made by the operator to the controller 6. When the arm control lever 18 is operated in an arm crowding direction, the arm control lever 18 outputs an arm crowding operation signal. When the arm control lever 18 is operated in an arm dumping direction, the arm control lever 18 outputs an arm dumping operation signal. When the arm crowding operation signal is inputted from the arm control lever 18 to the controller 6, the controller 6 switches the directional control valve 14 to a right-side position 14*c*. When the arm dumping operation signal is inputted to the controller 6, the controller 6 switches the directional control valve 14 to a left-side position 14*b*.

When the directional control valve 14 is switched to the right-side position 14*c*, a delivery port of the hydraulic pump 13 is connected to a bottom-side oil chamber 26*a* of the arm cylinder 26 via a hydraulic line 43 (bottom-side hydraulic line), and the rod-side oil chamber 26*b* of the arm cylinder 26 is connected to the tank 40 via a hydraulic line 44 (rod-side hydraulic line). Thus, the delivery oil from the hydraulic pump 13 flows into the bottom-side oil chamber 26*a*, the hydraulic operating fluid in the rod-side oil chamber 26*b* is discharged into the tank 40, and the arm cylinder 26 performs an extending operation. On the other hand, when the directional control valve 14 is switched to the left-side position 14*b*, the delivery port of the hydraulic pump 13 is connected to the rod-side oil chamber 26*b* via the rod-side hydraulic line 44, and the bottom-side oil chamber 26*a* is connected to the tank 40 via the bottom-side hydraulic line 43. Thus, the delivery oil from the hydraulic pump 13 flows into the rod-side oil chamber 26*b*, the hydraulic operating fluid in the bottom-side oil chamber 26*a* is discharged into the tank 40, and the arm cylinder 26 performs a contracting operation.

The accumulator 4 is hydraulic equipment (pressure accumulating device) that accumulates return oil from the bottom-side oil chamber 1*a* at a time of contraction of the boom cylinder 1 and that supplies a hydraulic fluid to the bottom-side oil chamber 1*a* at a time of extension of the boom cylinder 1. The accumulator 4 and the bottom-side hydraulic line 41 are connected to each other via a hydraulic line 45 (recovery hydraulic line). A control valve 2 is disposed on the recovery hydraulic line 45. The control valve 2 changes an opening degree thereof according to a control signal from the controller 6, and thus adjusts a flow rate (recovery flow rate) of the oil to be recovered from the bottom-side oil chamber 1*a* of the boom cylinder 1 to the accumulator 4.

The bottom-side hydraulic line 41 of the boom cylinder 1 and the rod-side hydraulic line 44 of the arm cylinder 26 are connected to each other via a hydraulic line 46 (regeneration hydraulic line). A control valve 27 is disposed on the regeneration hydraulic line 46. The control valve 27 changes an opening degree thereof according to a control signal from the controller 6, and thus adjusts a flow rate (regeneration flow rate) of the oil to be regenerated from the bottom-side oil chamber 1*a* of the boom cylinder 1 to the rod-side oil chamber 26*b* of the arm cylinder 26.

Figure 3:
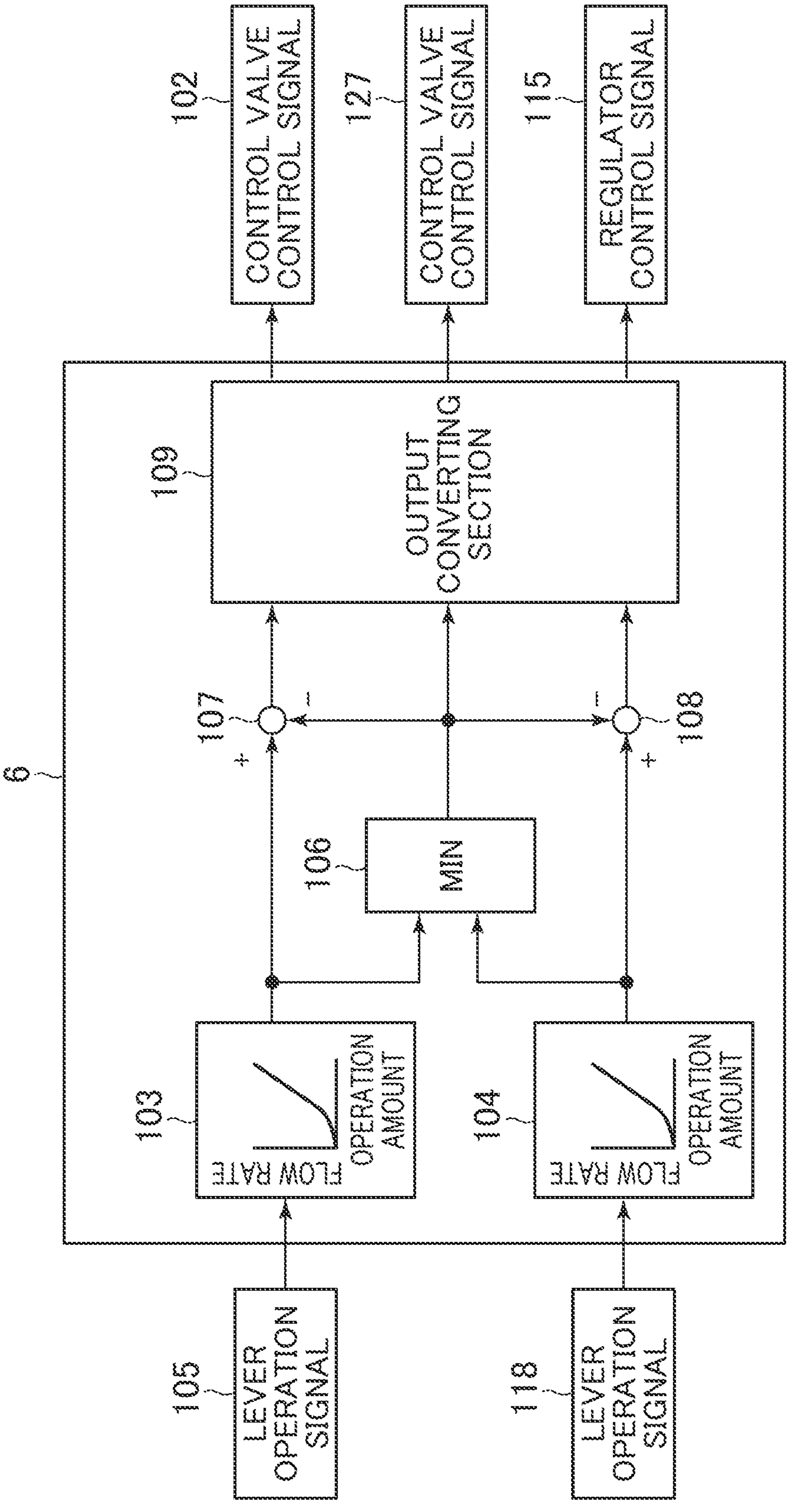
FIG. 3 is a diagram illustrating the details of processing performed by a controller in the first embodiment of the present invention.

The details of processing performed by the controller 6 will next be described with reference to FIG. 3.

A lever operation signal 105 is a signal inputted from the boom control lever 5 to the controller 6 according to an operation amount of the boom control lever 5 in the boom lowering direction. A lever operation signal 118 is a signal inputted from the arm control lever 18 to the controller 6 according to an operation amount of the arm control lever 18 in the arm dumping direction.

A function generating section 103 stores information regarding a correspondence between the operation amount of the boom control lever 5 in the boom lowering direction and a meter-out flow rate (return flow rate) of the oil from the bottom-side oil chamber 1*a* of the boom cylinder 1. The function generating section 103 converts the lever operation amount corresponding to the lever operation signal 105 into the meter-out flow rate in the boom cylinder 1, and outputs the meter-out flow rate to a minimum value selecting section 106 and a subtracting section 107.

A function generating section 104 stores information regarding a correspondence between the operation amount of the arm control lever 18 in the arm dumping direction and a meter-in flow rate (supply flow rate) of the oil to the rod-side oil chamber 26*b* of the arm cylinder 26. The function generating section 104 converts the lever operation amount corresponding to the lever operation signal 118 into the meter-in flow rate in the arm cylinder 26, and outputs the meter-in flow rate to the minimum value selecting section 106 and a subtracting section 108.

From among the meter-out flow rate in the boom cylinder 1, which is outputted from the function generating section 103, and the meter-in flow rate in the arm cylinder 26, which is outputted from the function generating section 104, the minimum value selecting section 106 selects the smaller flow rate and sets it as a regeneration flow rate (flow rate of the oil to be supplied from the boom cylinder 1 to the arm cylinder 26). The minimum value selecting section 106 outputs the regeneration flow rate to the subtracting sections 107 and 108 and an output converting section 109.

The subtracting section 107 subtracts the regeneration flow rate, which is outputted from the minimum value selecting section 106, from the meter-out flow rate in the boom cylinder 1, which is outputted from the function generating section 103, and set the obtained value as a recovery flow rate (flow rate of the oil to be supplied from the boom cylinder 1 to the accumulator 4). The subtracting section 107 outputs the recovery flow rate to the output converting section 109.

As a result of computing the regeneration flow rate and the recovery flow rate as described above, the return oil from the boom cylinder 1 is regenerated in the arm cylinder 26 to a maximum extent, and the remaining return oil is accumulated in the accumulator 4. The amount of the hydraulic fluid accumulated in the accumulator 4 is thus minimized. It is therefore possible to reduce an energy loss due to heat radiation and a leak at a time of accumulating the hydraulic fluid in the accumulator 4.

The subtracting section 108 subtracts the regeneration flow rate, which is outputted from the minimum value selecting section 106, from the meter-in flow rate in the arm cylinder 26, which is outputted from the function generating section 104, and sets the obtained value as a pump flow rate (flow rate of the oil to be supplied from the hydraulic pump 13 to the arm cylinder 26). The subtracting section 108 outputs the pump flow rate to the output converting section 109.

As a result of computing the regeneration flow rate and the pump flow rate as described above, it is possible to supply the arm cylinder 26 with a flow rate of the oil desired by the operator, and improve fuel consumption by reducing the flow rate of the delivery oil from the hydraulic pump 13 by the regeneration flow rate.

The output converting section 109 outputs, to the control valve 27, a control valve control signal 127 for making the flow rate of the oil passing through the control valve 27 coincide with the regeneration flow rate outputted from the minimum value selecting section 106. The output converting section 109 also outputs, to the control valve 2, a control valve control signal 102 for making the flow rate of the oil passing through the control valve 2 coincide with the recovery flow rate outputted from the subtracting section 107. Further, the output converting section 109 outputs, to a regulator 15, a regulator control signal 115 for making the flow rate of the delivery oil from the hydraulic pump 13 coincide with the pump flow rate outputted from the subtracting section 108.

(Operation)

The operation of the hydraulic drive system 300 will be described with reference to FIG. 2.

An extending operation of the boom cylinder 1 (rising operation of the boom 205) will first be described.

When the boom control lever 5 is operated in the boom raising direction, a boom raising operation signal is inputted to the controller 6. When receiving the boom raising operation signal, the controller 6 switches the directional control valve 28 to the right-side position 28*c*. Thus, the delivery oil from the hydraulic pump 32 flows into the bottom-side oil chamber 1*a*, the hydraulic operating fluid discharged from the rod-side oil chamber 1*b* is returned to the tank 40, and the boom cylinder 1 performs an extending operation.

A contracting operation of the boom cylinder 1 (lowering operation of the boom 205) will next be described.

When the boom control lever 5 is operated in the boom lowering direction, a boom lowering operation signal is inputted to the controller 6. When receiving the boom lowering operation signal, the controller 6 switches the directional control valve 28 to the left-side position 28*b* and opens the control valve 2 according to a lever operation amount. Thus, all of the hydraulic fluids discharged from the bottom-side oil chamber 1*a* flows into the accumulator 4, and the boom cylinder 1 performs a contracting operation. At this time, the hydraulic fluid is supplied from the hydraulic pump 32 to the rod-side oil chamber 1*b*, so that the rod side of the boom cylinder 1 can be prevented from having a negative pressure.

An extending operation of the arm cylinder 26 (crowding operation of the arm 206) will next be described.

When the arm control lever 18 is operated in the arm crowding direction, an arm crowding operation signal is inputted to the controller 6. When receiving the arm crowding operation signal, the controller 6 switches the directional control valve 14 to the right-side position 14*c*. Thus, the delivery oil from the hydraulic pump 13 flows into the bottom-side oil chamber 26*a* of the arm cylinder 26, the hydraulic operating fluid discharged from the rod-side oil chamber 26*b* is returned to the tank 40, and the arm cylinder 26 performs an extending operation.

A contracting operation of the arm cylinder 26 (dumping operation of the arm 206) will next be described.

When the arm control lever 18 is operated in the arm dumping direction, an arm dumping operation signal is inputted to the controller 6. When receiving the arm dumping operation signal, the controller 6 switches the directional control valve 14 to the left-side position 14*b*. Thus, the delivery oil from the hydraulic pump 13 flows into the rod-side oil chamber 26*b* of the arm cylinder 26, the hydraulic operating fluid discharged from the bottom-side oil chamber 26*a* is returned to the tank 40, and the arm cylinder 26 performs a contracting operation.

Description will finally be made regarding a composite operation of a contracting operation of the boom cylinder 1 (lowering operation of the boom 205) and a contracting operation of the arm cylinder 26 (dumping operation of the arm 206).

When the boom control lever 5 is operated in the boom lowering direction and the arm control lever 18 is operated in the arm dumping direction, a boom lowering operation signal and an arm dumping operation signal are inputted to the controller 6. The controller 6 switches the directional control valve 28 to the left-side position 28*b* in response to the reception of the boom lowering operation signal, switches the directional control valve 14 to the left-side position 14*b* in response to the reception of the arm dumping operation signal, and adjusts the opening degrees of the control valves 2 and 27 according to operation amounts of the control levers 5 and 18. Thus, the boom cylinder 1 performs a contracting operation, and the arm cylinder 26 performs a contracting operation. At this time, a part of the return oil from the bottom-side oil chamber 1*a* of the boom cylinder 1 is regenerated in the rod-side oil chamber of the arm cylinder 26, and the remaining oil is accumulated in the accumulator 4.

(Effects)

In the present embodiment, a construction machine 100 includes a first hydraulic actuator 1, a pressure accumulating device 4 that accumulates return oil from the first hydraulic actuator 1, a first control valve 2 disposed on a first hydraulic line 45 that connects the first hydraulic actuator 1 and the pressure accumulating device 4 to each other, a second hydraulic actuator 26, a second control valve 27 disposed on a second hydraulic line 46 that connects the second hydraulic actuator 26 and the first hydraulic line 45 to each other, a first operation device 5 that outputs an operation signal for the first hydraulic actuator 1, a second operation device 18 that outputs an operation signal for the second hydraulic actuator 26, and a controller 6 that is inputted with the operation signals from the first operation device 5 and the second operation device 18 and outputs a control signal to the first control valve 2 and the second control valve 27. The controller 6 computes a flow rate of return oil from the first hydraulic actuator 1 on the basis of the operation signal from the first operation device 5, computes a flow rate of oil to be supplied to the second hydraulic actuator 26 on the basis of the operation signal from the second operation device 18, sets smaller one of the flow rate of the return oil and the flow rate of the oil to be supplied, as a regeneration flow rate that is a flow rate of oil to be regenerated in the second hydraulic actuator 26, sets a flow rate obtained by subtracting the regeneration flow rate from the flow rate of the return oil, as a recovery flow rate that is a flow rate of oil to be recovered to the pressure accumulating device 4, adjusts an opening degree of the first control valve 2 such that a flow rate of oil supplied from the first hydraulic actuator to the second hydraulic actuator 26 coincides with the recovery flow rate, and adjusts an opening degree of the second control valve 27 such that a flow rate of oil supplied from the first hydraulic actuator 1 to the second hydraulic actuator 26 coincides with the regeneration flow rate.

According to the present embodiment configured as described above, an energy loss due to heat radiation and a leak at a time of accumulating the hydraulic fluid in the pressure accumulating device 4 is suppressed by maximizing the flow rate of the return oil from the first hydraulic actuator 1 which is to be regenerated in the second hydraulic actuator 26, and minimizing the flow rate of the return oil from the first hydraulic actuator 1 which is to be recovered to the pressure accumulating device 4. The return oil from the first hydraulic actuator 1 can thus be used effectively.

In addition, in the present embodiment, one port of the second control valve 27 is connected to the second hydraulic actuator 26, and the other port of the second control valve 27 is connected to the first control valve 2 and the first hydraulic actuator 1. Thus, the first hydraulic actuator 1 and the second hydraulic actuator 26 are connected to each other via only the second control valve 27. It is therefore possible to suppress a pressure loss at a time of regenerating the return oil from the first hydraulic actuator 1 in the second hydraulic actuator 26.

Moreover, the construction machine 200 according to the present embodiment includes a variable displacement hydraulic pump 13 that supplies a hydraulic fluid to the second hydraulic actuator 26, and a regulator 15 that adjusts a displacement of the hydraulic pump 13 according to a control signal from the controller 6. The controller 6 sets, as a pump flow rate, a flow rate obtained by subtracting the flow rate of the oil to be regenerated in the pressure accumulating device 4 from the flow rate of the oil to be supplied to the second hydraulic actuator 26, and controls the regulator 15 such that a flow rate of the delivery oil from the hydraulic pump 13 coincides with the pump flow rate. It is thus possible to supply a target flow rate of the oil to the second hydraulic actuator 26, and improve fuel consumption by reducing the flow rate of the delivery oil from the hydraulic pump 13 by the regeneration flow rate.

Second Embodiment

Figure 4:
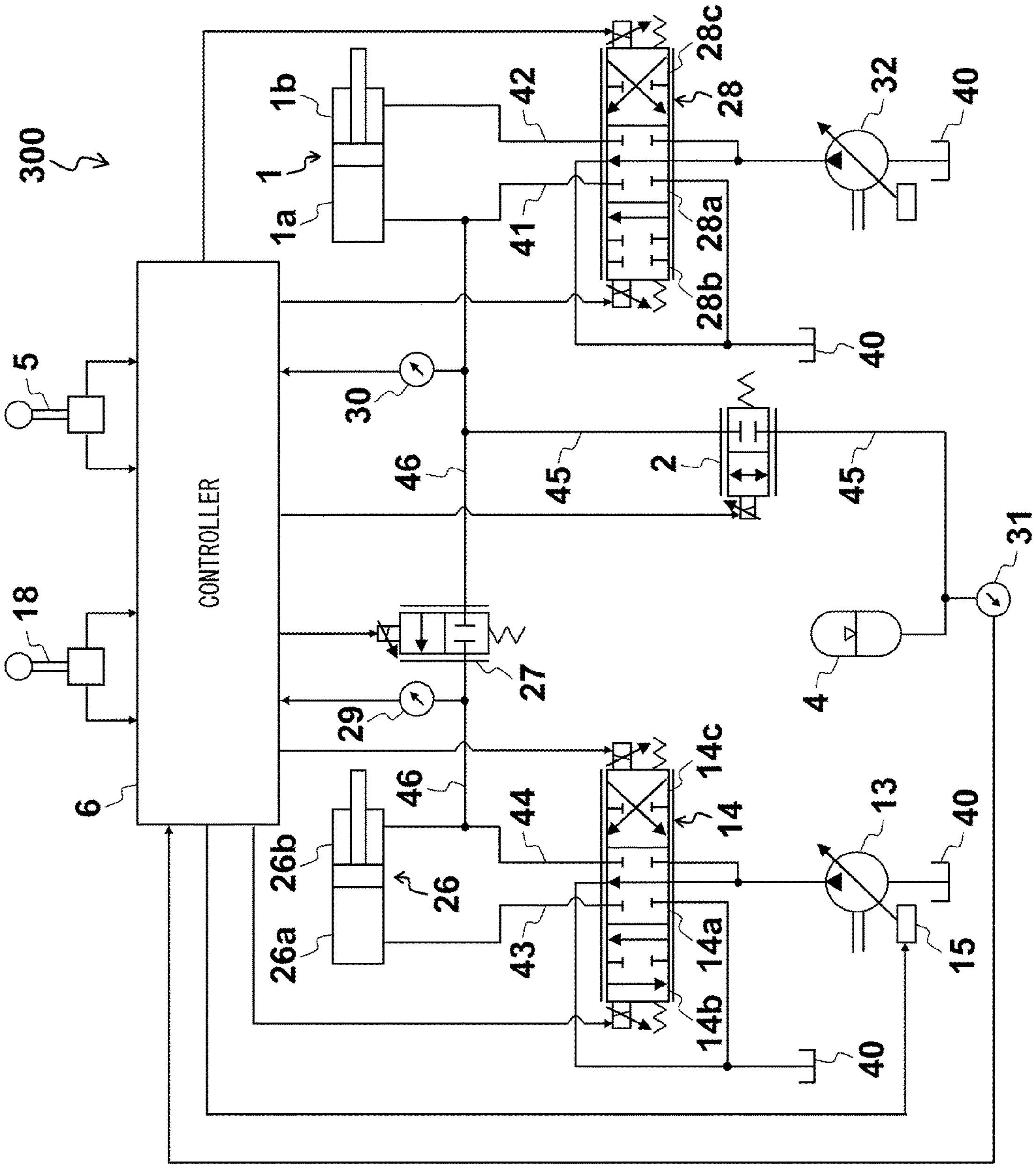
FIG. 4 is a circuit diagram of a hydraulic drive system in a second embodiment of the present invention.
Figure 5:
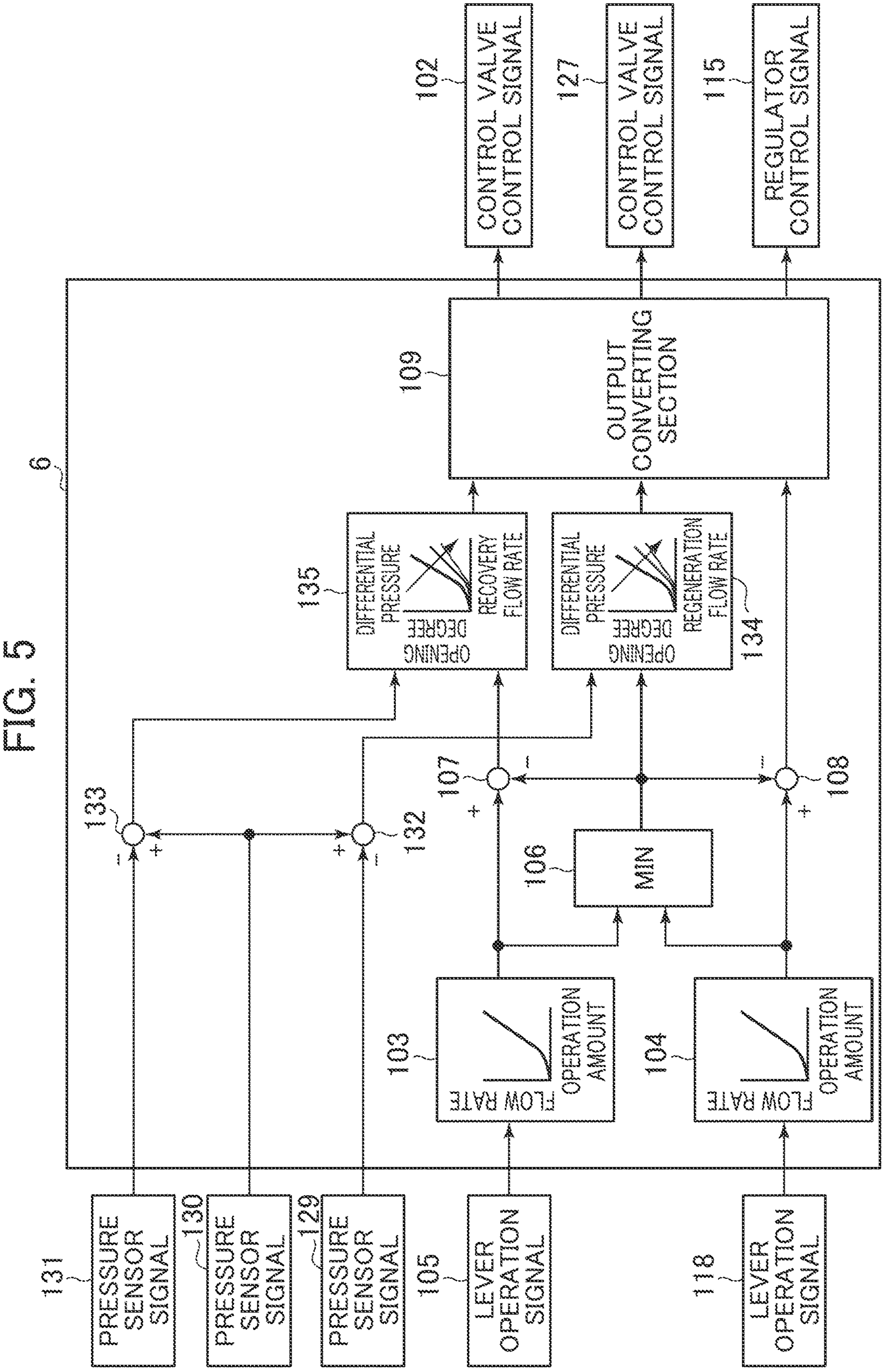
FIG. 5 is a diagram illustrating the details of processing performed by a controller in the second embodiment of the present invention.

A second embodiment of the present invention will be described with reference to FIG. 4 and FIG. 5. FIG. 4 is a circuit diagram of a hydraulic drive system 300 in the present embodiment. FIG. 5 is a diagram illustrating the details of processing performed by a controller 6 in the present embodiment.

In FIG. 4, differences from the hydraulic drive system 300 (illustrated in FIG. 2) in the first embodiment will be described.

A pressure sensor 29 that senses the rod pressure in the arm cylinder 26 is disposed on a part of the regeneration hydraulic line 46 between the rod-side hydraulic line 44 of the arm cylinder 26 and the control valve 27. A pressure sensor 30 that senses the bottom pressure in the boom cylinder 1 is disposed on a part of the regeneration hydraulic line 46 between the bottom-side hydraulic line 41 of the boom cylinder 1 and the control valve 27. A pressure sensor 31 that senses the pressure in the accumulator 4 is disposed on a part of the recovery hydraulic line 45 between the accumulator 4 and the control valve 2. Pressure signals outputted from the pressure sensors 29 to 31 are inputted to the controller 6. Such a configuration makes it possible to adjust the opening degrees of the control valves 2 and 27 with high accuracy according to the bottom pressure in the boom cylinder 1, the rod pressure in the arm cylinder 26, and the pressure in the accumulator 4.

In FIG. 5, differences from the details of the processing performed by the controller 6 (illustrated in FIG. 3) in the first embodiment will be described.

A pressure sensor signal 129 is a signal inputted from the pressure sensor 29 to the controller 6. The pressure sensor signal 129 corresponds to the rod pressure in the arm cylinder 26. A pressure sensor signal 130 is a signal inputted from the pressure sensor 30 to the controller 6. The pressure sensor signal 130 corresponds to the bottom pressure in the boom cylinder 1. A pressure sensor signal 131 is a signal inputted from the pressure sensor 31 to the controller 6. The pressure sensor signal 131 corresponds to the pressure in the accumulator 4.

A subtracting section 132 outputs, to a function generating section 134, a differential pressure (differential pressure across the control valve 27) obtained by subtracting the rod pressure in the arm cylinder 26, which corresponds to the pressure sensor signal 129, from the bottom pressure in the boom cylinder 1, which corresponds to the pressure sensor signal 130. A subtracting section 133 outputs, to a function generating section 135, a differential pressure (differential pressure across the control valve 2) obtained by subtracting the pressure in the accumulator 4, which corresponds to the pressure sensor signal 131, from the bottom pressure in the boom cylinder 1, which corresponds to the pressure sensor signal 130.

The regeneration flow rate outputted from the minimum value selecting section 106 as well as the differential pressure outputted from the subtracting section 132 is inputted to the function generating section 134. The function generating section 134 stores information regarding a correspondence between the flow rate of the oil to be regenerated from the bottom side of the boom cylinder 1 to the rod side of the arm cylinder 26 and the opening degree of the control valve 27. The function generating section 134 converts the regeneration flow rate outputted from the minimum value selecting section 106 into the opening degree of the control valve 27, and outputs the opening degree to the output converting section 109. The function generating section 134 adjusts the opening degree of the control valve 27 to an enlarging side according to an increase in the regeneration flow rate, and adjusts the opening degree of the control valve 27 to a reducing side according to an increase in the differential pressure from the subtracting section 132. In general, the pressures in the boom cylinder 1 and the arm cylinder 26 vary, the regeneration flow rate increases when the differential pressure between the bottom pressure in the boom cylinder 1 and the rod pressure in the arm cylinder 26 increases, and the regeneration flow rate decreases when the differential pressure decreases. Accordingly, the opening degree of the control valve 27 is adjusted according to the differential pressure as described above, and a target flow rate of oil can thus be regenerated even when the differential pressure varies.

The recovery flow rate outputted from the subtracting section 107 as well as the differential pressure outputted from the subtracting section 133 is inputted to the function generating section 135. The function generating section 135 stores information regarding a correspondence between the flow rate of oil to be recovered from the bottom side of the boom cylinder 1 to the accumulator 4 and the opening degree of the control valve 2. The function generating section 135 converts the recovery flow rate outputted from the subtracting section 107 into the opening degree of the control valve 2, and outputs the opening degree to the output converting section 109. The function generating section 135 adjusts the opening degree of the control valve 2 to an enlarging side according to an increase in the recovery flow rate, and adjusts the opening degree of the control valve 2 to a reducing side according to an increase in the differential pressure from the subtracting section 133. In general, the pressure in the boom cylinder 1 varies, the recovery flow rate increases when the differential pressure between the bottom pressure in the boom cylinder 1 and the pressure in the accumulator 4 increases, and the recovery flow rate decreases when the differential pressure decreases. Accordingly, the opening degree of the control valve 2 is adjusted according to the differential pressure as described above, and a target flow rate of oil can thus be recovered even when the differential pressure varies.

(Effects)

The construction machine 200 according to the present embodiment includes a first pressure sensor 30 that senses a pressure in the first hydraulic actuator 1, and a second pressure sensor 29 that senses a pressure in the second hydraulic actuator 26. The controller 6 adjusts the opening degree of the second control valve 27 according to pressure signals from the first pressure sensor 30 and the second pressure sensor 29.

The present embodiment configured as described above also provides effects similar to those of the first embodiment. In addition, the flow rate of oil passing through the second control valve 27 (the flow rate of oil to be regenerated from the first hydraulic actuator 1 to the second hydraulic actuator 26) can be adjusted with high accuracy by adjusting the opening degree of the second control valve 27 according to the pressure signals from the first pressure sensor 30 and the second pressure sensor 29.

Further, in the present embodiment, the controller 6 computes a differential pressure by subtracting the pressure in the second hydraulic actuator 26 from the pressure in the first hydraulic actuator 1, decreases the opening degree of the second control valve 27 according to an increase in the differential pressure, and increases the opening degree of the second control valve 27 according to a decrease in the differential pressure. Thus, a target flow rate of oil can be regenerated from the first hydraulic actuator 1 to the second hydraulic actuator even when the pressures in the first hydraulic actuator 1 and the second hydraulic actuator 26 vary.

In addition, the construction machine 200 according to the present embodiment includes the first pressure sensor 30 that senses a pressure in the first hydraulic actuator 1, and a third pressure sensor 31 that senses a pressure in the pressure accumulating device 4. The controller 6 adjusts the opening degree of the first control valve 2 according to pressure signals from the first pressure sensor 30 and the third pressure sensor 31. Thus, the flow rate of oil passing through the first control valve 2 (flow rate of oil to be recovered from the first hydraulic actuator 1 to the pressure accumulating device 4) can be adjusted with high accuracy.

Moreover, in the present embodiment, the controller 6 computes a differential pressure by subtracting the pressure in the pressure accumulating device 4 from the pressure in the first hydraulic actuator 1, decreases the opening degree of the first control valve 2 according to an increase in the differential pressure, and increases the opening degree of the first control valve 2 according to a decrease in the differential pressure. Thus, a target flow rate of oil can be recovered from the first hydraulic actuator to the pressure accumulating device 4 even when the pressures in the first hydraulic actuator 1 and the pressure accumulating device 4 vary.

Third Embodiment

Figure 6:
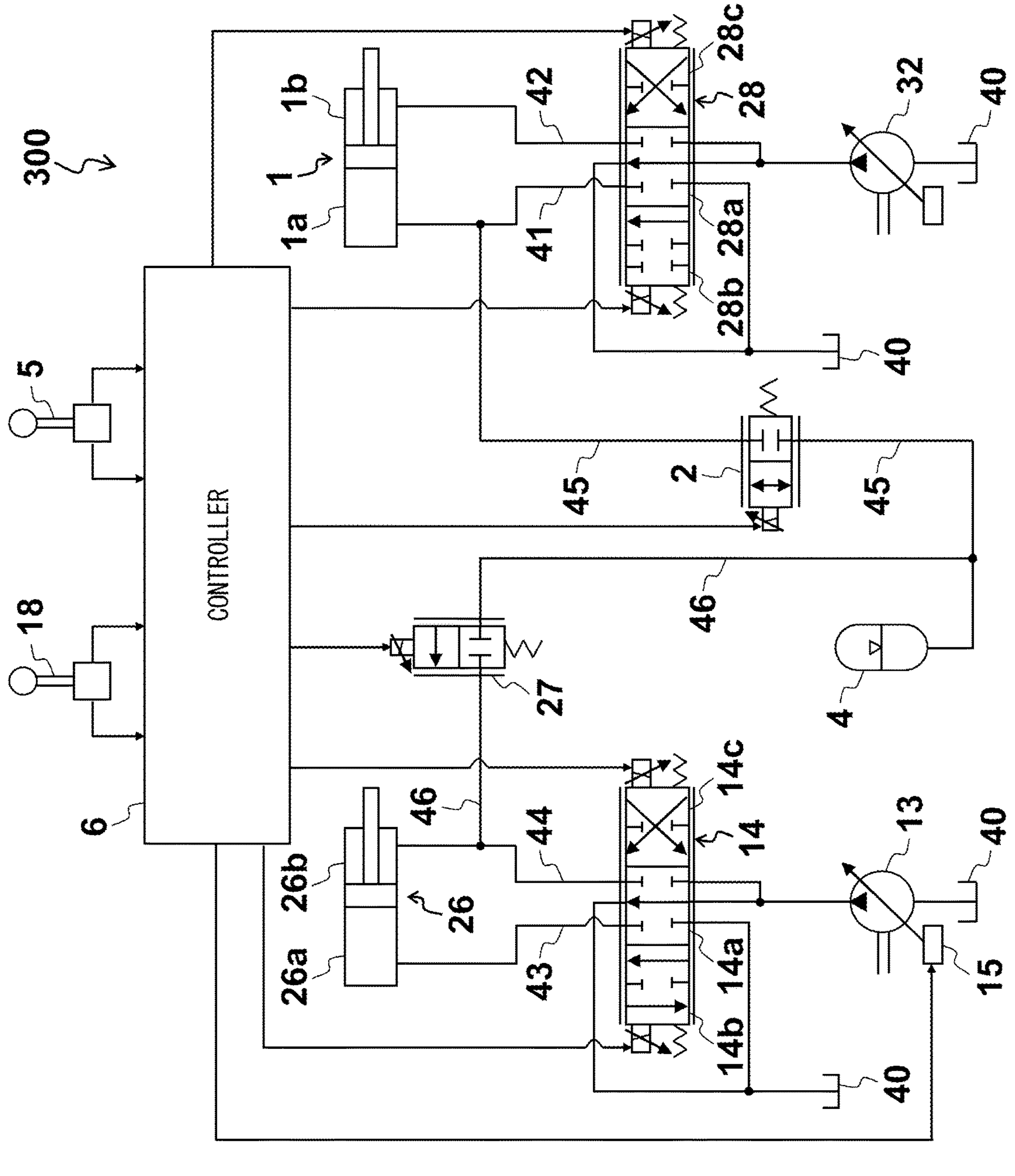
FIG. 6 is a circuit diagram of a hydraulic drive system in a third embodiment of the present invention.

A third embodiment of the present invention will be described with reference to FIG. 6. FIG. 6 is a circuit diagram of a hydraulic drive system 300 in the present embodiment. In the following, differences from the hydraulic drive system 300 (illustrated in FIG. 2) in the first embodiment will be described.

The upstream side of the regeneration hydraulic line 46 in the first embodiment is connected to the bottom-side hydraulic line 41 of the boom cylinder 1. However, the upstream side of the regeneration hydraulic line 46 in the present embodiment is connected to a part of the recovery hydraulic line 45 between the accumulator 4 and the control valve 2.

(Effects)

In the present embodiment, one port of the second control valve 27 is connected to the second hydraulic actuator 26, and the other port of the second control valve 27 is connected to the first control valve 2 and the pressure accumulating device 4.

The present embodiment configured as described above provides the following effects in addition to the effects of the first embodiment.

The pressure in the accumulator 4 varies less than the bottom pressure in the boom cylinder 1. Therefore, the differential pressure across the control valve 27 can be stabilized more than that in the first embodiment by changing the upstream side of the regeneration hydraulic line 46 to the accumulator 4. Consequently, the flow rate at the time when the control valve 27 is opened is stable, so that better operability than that in the first embodiment can be realized.

Fourth Embodiment

Figure 7:
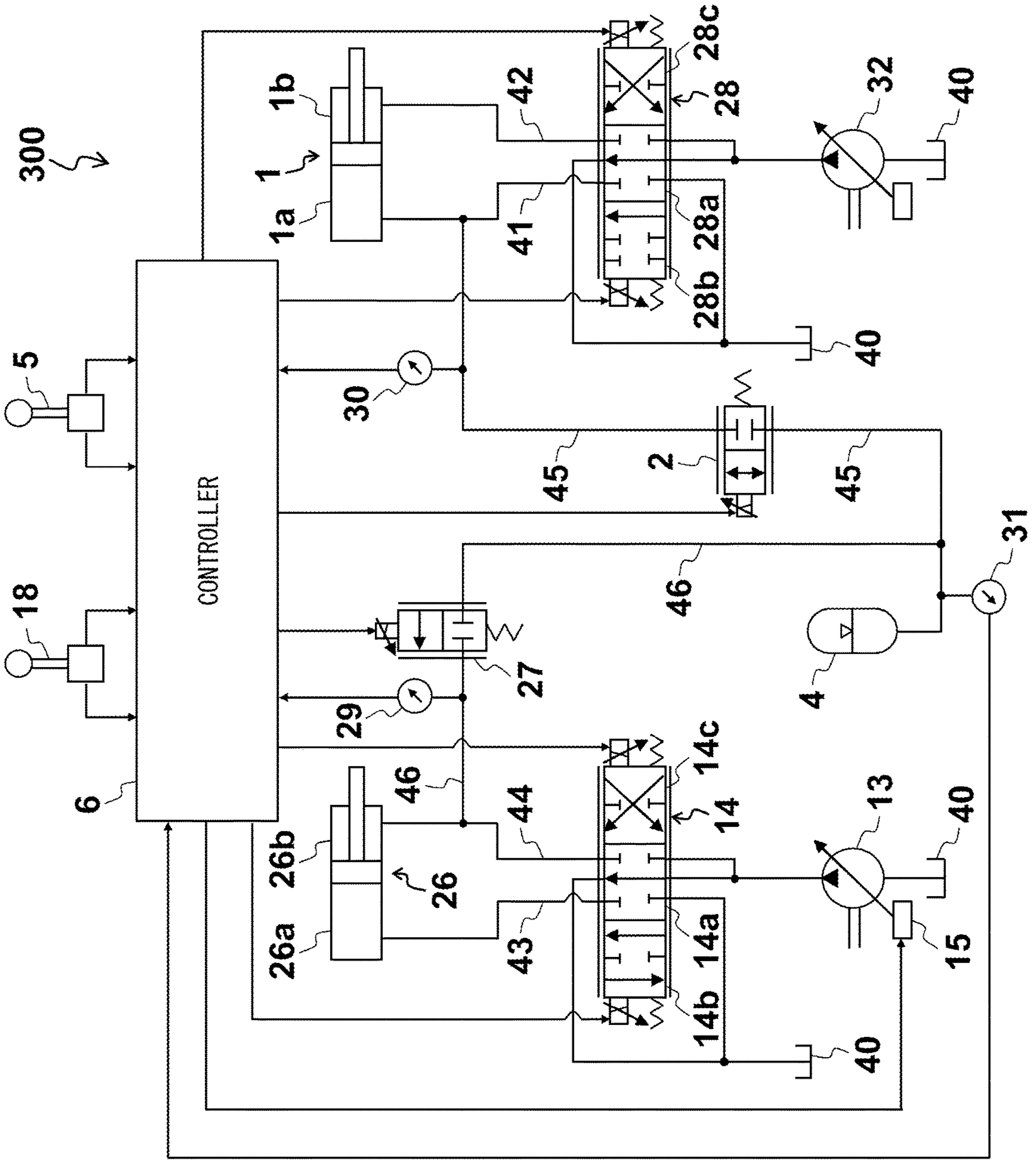
FIG. 7 is a circuit diagram of a hydraulic drive system in a fourth embodiment of the present invention.
Figure 8:
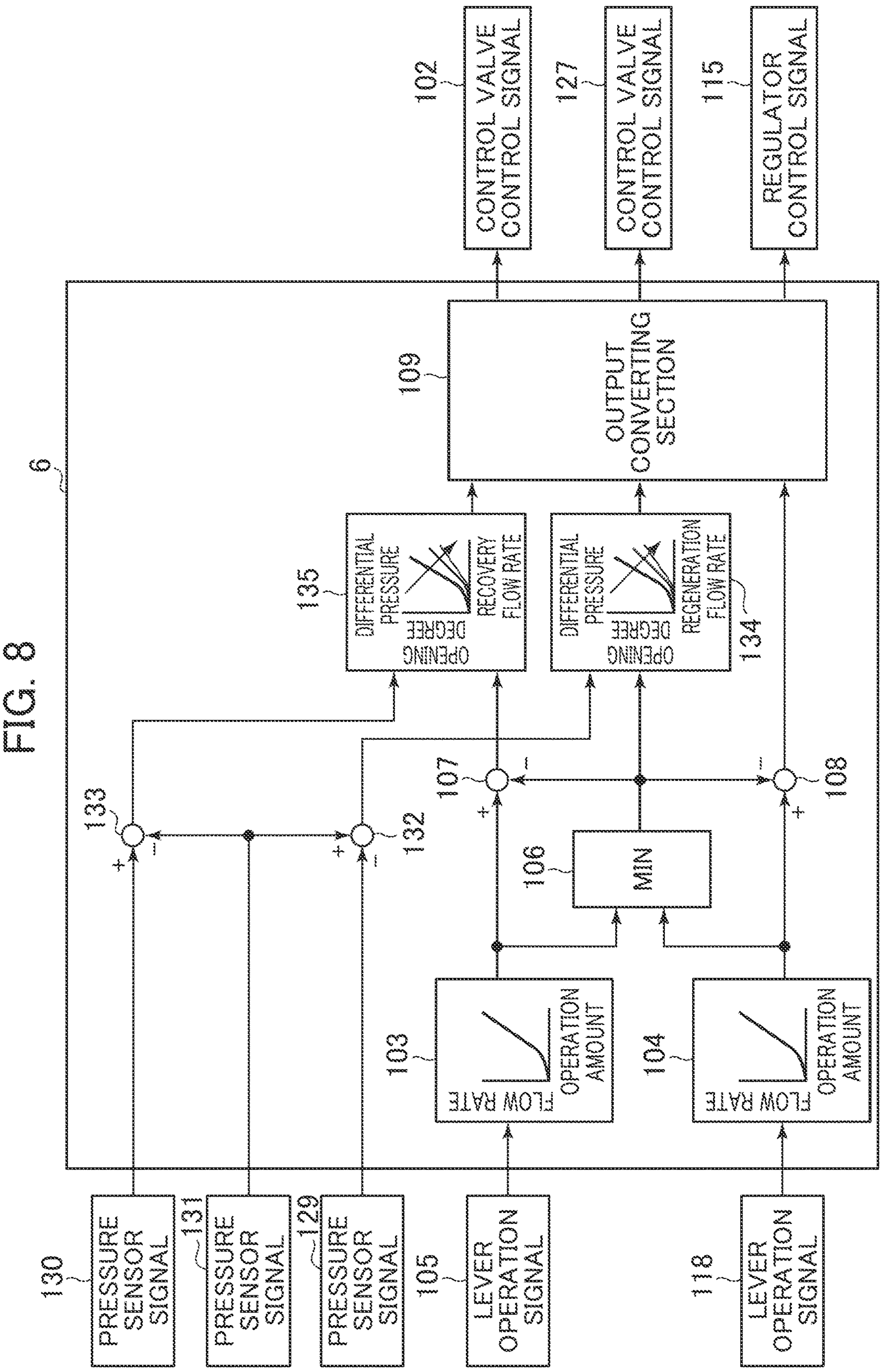
FIG. 8 is a diagram illustrating the details of processing performed by a controller in the fourth embodiment of the present invention.

A fourth embodiment of the present invention will be described with reference to FIG. 7 and FIG. 8. FIG. 7 is a circuit diagram of a hydraulic drive system 300 in the present embodiment. FIG. 8 is a diagram illustrating the details of processing performed by a controller 6 in the present embodiment.

In FIG. 7, differences from the hydraulic drive system 300 (illustrated in FIG. 4) in the second embodiment will be described.

The upstream side of the regeneration hydraulic line 46 in the second embodiment is connected to the bottom-side hydraulic line 41 of the boom cylinder 1. However, the upstream side of the regeneration hydraulic line 46 in the present embodiment is connected to a part of the recovery hydraulic line 45 between the accumulator 4 and the control valve 2.

In FIG. 8, differences from the details of the processing (illustrated in FIG. 5) performed by the controller 6 in the second embodiment will be described.

The subtracting section 132 in the second embodiment computes, as the differential pressure across the control valve 27, a differential pressure by subtracting the rod pressure in the arm cylinder 26, which corresponds to the pressure sensor signal 129, from the bottom pressure in the boom cylinder 1, which corresponds to the pressure sensor signal 130. However, the subtracting section 132 in the present embodiment computes, as the differential pressure across the control valve 27, a differential pressure by subtracting the rod pressure in the arm cylinder 26, which corresponds to the pressure sensor signal 129, from the pressure in the accumulator 4, which corresponds to the pressure sensor signal 131.

(Effects)

The construction machine 200 according to the present embodiment includes a second pressure sensor 29 that senses a pressure in the second hydraulic actuator 26, and a third pressure sensor 31 that senses a pressure in the pressure accumulating device 4. The controller 6 adjusts the opening degree of the second control valve 27 according to pressure signals from the second pressure sensor 29 and the third pressure sensor 31.

The present embodiment configured as described above also provides effects similar to those of the third embodiment. In addition, the flow rate of oil passing through the second control valve 27 (flow rate of oil to be regenerated from the first hydraulic actuator 1 to the second hydraulic actuator 26) can be adjusted finely by adjusting the opening degree of the second control valve 27 according to the pressure signals from the second pressure sensor 29 and the third pressure sensor 31.

Further, in the present embodiment, the controller computes a differential pressure by subtracting the pressure in the second hydraulic actuator from the pressure in the pressure accumulating device, decreases the opening degree of the second control valve according to an increase in the differential pressure, and increases the opening degree of the second control valve according to a decrease in the differential pressure. Thus, a target flow rate of oil can be regenerated from the first hydraulic actuator 1 to the second hydraulic actuator 26 even when the pressures in the pressure accumulating device 4 and the first hydraulic actuator 1 vary.

The embodiments of the present invention have been described above in detail. However, the present invention is not limited to the foregoing embodiments, and includes various modifications. For example, the foregoing embodiments have been described in detail in order to describe the present invention in an easily understandable manner, and are not necessarily limited to the embodiments including all of the described configurations. In addition, it is possible to add a part of a configuration of a certain embodiment to a configuration of another embodiment, and it is also possible to omit a part of a configuration of a certain embodiment or replace a part of a configuration of a certain embodiment with a part of another embodiment.

DESCRIPTION OF REFERENCE CHARACTERS

1: Boom cylinder (first hydraulic actuator)
2: Control valve (first control valve)
4: Accumulator (pressure accumulating device)
5: Boom control lever (first operation device)
6: Controller
13: Hydraulic pump
14: Directional control valve
14*a*: Neutral position
14*b*: Left-side position
14*c*: Right-side position
15: Regulator
18: Arm control lever (second operation device)
26: Arm cylinder (second hydraulic actuator)
27: Control valve (second control valve)
28: Directional control valve
28*a*: Neutral position
28*b*: Left-side position
28*c*: Right-side position
29: Pressure sensor (second pressure sensor)
30: Pressure sensor (first pressure sensor)
31: Pressure sensor (third pressure sensor)
32: Hydraulic pump

40: Tank
41: Bottom-side hydraulic line
42: Rod-side hydraulic line
43: Bottom-side hydraulic line
44: Rod-side hydraulic line
45: Recovery hydraulic line (first hydraulic line)
46: Regeneration hydraulic line (second hydraulic line)
102: Control valve control signal
103, 104: Function generating section
105: Lever operation signal
106: Minimum value selecting section
107, 108: Subtracting section
109: Output converting section
113: Tilting control signal
118: Lever operation signal
127: Control valve control signal
129 to 131: Pressure sensor signal
132, 133: Subtracting section
134, 135: Function generating section
200: Hydraulic excavator (construction machine)
201: Track structure
202: Swing structure
203: Work device
204: Swing motor
205: Boom
206: Arm
207: Bucket
209: Bucket cylinder
210: Cab
211: Counterweight
212: Machine room
213: Control valve
300: Hydraulic drive system

The invention claimed is:

1. A construction machine comprising:
a first hydraulic actuator;
a pressure accumulating device that accumulates return oil from the first hydraulic actuator;
a first control valve disposed on a first hydraulic line that connects the first hydraulic actuator and the pressure accumulating device to each other;
a second hydraulic actuator;
a second control valve disposed on a second hydraulic line that connects the second hydraulic actuator and the first hydraulic line to each other;
a first operation device that outputs an operation signal for the first hydraulic actuator;
a second operation device that outputs an operation signal for the second hydraulic actuator; and
a controller that is inputted with the operation signals from the first operation device and the second operation device and outputs a control signal to the first control valve and the second control valve, wherein
the controller is configured to
compute a flow rate of the return oil from the first hydraulic actuator on a basis of the operation signal from the first operation device,
compute a flow rate of oil to be supplied to the second hydraulic actuator on a basis of the operation signal from the second operation device,
set smaller one of the flow rate of the return oil and the flow rate of the oil to be supplied, as a regeneration flow rate that is a flow rate of oil to be regenerated in the second hydraulic actuator,
set a flow rate obtained by subtracting the regeneration flow rate from the flow rate of the return oil, as a recovery flow rate that is a flow rate of oil to be recovered to the pressure accumulating device,
adjust an opening degree of the first control valve such that a flow rate of oil supplied from the first hydraulic actuator to the pressure accumulating device coincides with the recovery flow rate, and
adjust an opening degree of the second control valve such that a flow rate of oil supplied from the first hydraulic actuator to the second hydraulic actuator coincides with the regeneration flow rate,
one port of the second control valve is connected to the second hydraulic actuator,
another port of the second control valve is connected to the first control valve and the first hydraulic actuator, and
the controller is configured to compute a differential pressure by subtracting a pressure in the second hydraulic actuator from a pressure in the first hydraulic actuator, decrease the opening degree of the second control valve according to an increase in the differential pressure, and increase the opening degree of the second control valve according to a decrease in the differential pressure.

2. The construction machine according to claim 1, including:
a first pressure sensor that senses a pressure in the first hydraulic actuator; and
a second pressure sensor that senses a pressure in the second hydraulic actuator, wherein
the controller is configured to adjust the opening degree of the second control valve according to pressure signals from the first pressure sensor and the second pressure sensor.

3. The construction machine according to claim 1, wherein
one port of the second control valve is connected to the second hydraulic actuator, and
another port of the second control valve is connected to the first control valve and the pressure accumulating device.

4. The construction machine according to claim 3, including:
a second pressure sensor that senses a pressure in the second hydraulic actuator; and
a third pressure sensor that senses a pressure in the pressure accumulating device, wherein
the controller is configured to adjust the opening degree of the second control valve according to pressure signals from the second pressure sensor and the third pressure sensor.

5. The construction machine according to claim 1, including:
a first pressure sensor that senses a pressure in the first hydraulic actuator; and
a third pressure sensor that senses a pressure in the pressure accumulating device, wherein
the controller is configured to adjust the opening degree of the first control valve according to pressure signals from the first pressure sensor and the third pressure sensor.

6. The construction machine according to claim 1, wherein
the controller is configured to compute a differential pressure by subtracting a pressure in the pressure accumulating device from the pressure in the first hydraulic actuator, decrease the opening degree of the first control valve according to an increase in the differential pressure, and increase the opening degree of the first control valve according to a decrease in the differential pressure.

7. The construction machine according to claim 1, including:

a variable displacement hydraulic pump that supplies a hydraulic fluid to the second hydraulic actuator; and a regulator that adjusts a displacement of the hydraulic pump according to a control signal from the controller, wherein the controller is configured to set, as a pump flow rate, a flow rate obtained by subtracting the regeneration flow rate from the flow rate of the oil to be supplied, and control the regulator such that a flow rate of the hydraulic fluid from the hydraulic pump coincides with the pump flow rate.

8. A construction machine comprising:

a first hydraulic actuator;

a pressure accumulating device that accumulates return oil from the first hydraulic actuator;

a first control valve disposed on a first hydraulic line that connects the first hydraulic actuator and the pressure accumulating device to each other;

a second hydraulic actuator;

a second control valve disposed on a second hydraulic line that connects the second hydraulic actuator and the first hydraulic line to each other;

a first operation device that outputs an operation signal for the first hydraulic actuator;

a second operation device that outputs an operation signal for the second hydraulic actuator; and a controller that is inputted with the operation signals from the first operation device and the second operation device and outputs a control signal to the first control valve and the second control valve, wherein the controller is configured to compute a flow rate of the return oil from the first hydraulic actuator on a basis of the operation signal from the first operation device, compute a flow rate of oil to be supplied to the second hydraulic actuator on a basis of the operation signal from the second operation device, set smaller one of the flow rate of the return oil and the flow rate of the oil to be supplied, as a regeneration flow rate that is a flow rate of oil to be regenerated in the second hydraulic actuator, set a flow rate obtained by subtracting the regeneration flow rate from the flow rate of the return oil, as a recovery flow rate that is a flow rate of oil to be recovered to the pressure accumulating device, adjust an opening degree of the first control valve such that a flow rate of oil supplied from the first hydraulic actuator to the pressure accumulating device coincides with the recovery flow rate, and adjust an opening degree of the second control valve such that a flow rate of oil supplied from the first hydraulic actuator to the second hydraulic actuator coincides with the regeneration flow rate, one port of the second control valve is connected to the second hydraulic actuator, another port of the second control valve is connected to the first control valve and the pressure accumulating device, the construction machine includes:

a second pressure sensor that senses a pressure in the second hydraulic actuator; and a third pressure sensor that senses a pressure in the pressure accumulating device, and the controller is configured to adjust the opening degree of the second control valve according to pressure signals from the second pressure sensor and the third pressure sensor, and compute a differential pressure by subtracting the pressure in the second hydraulic actuator from the pressure in the pressure accumulating device, decrease the opening degree of the second control valve according to an increase in the differential pressure, and increase the opening degree of the second control valve according to a decrease in the differential pressure.

* * * * *